(12) United States Patent
Knollenberg et al.

(10) Patent No.: US 11,428,617 B2
(45) Date of Patent: Aug. 30, 2022

(54) SLURRY MONITOR COUPLING BULK SIZE DISTRIBUTION AND SINGLE PARTICLE DETECTION

(71) Applicant: PARTICLE MEASURING SYSTEMS, INC., Boulder, CO (US)

(72) Inventors: Brian A. Knollenberg, Boulder, CO (US); Daniel Rodier, Boulder, CO (US)

(73) Assignee: Particle Measuring Systems, Inc., Boulder, CO (US)

( * ) Notice: Subject to any disclaimer, the term of this patent is extended or adjusted under 35 U.S.C. 154(b) by 0 days.

(21) Appl. No.: 17/136,682

(22) Filed: Dec. 29, 2020

(65) Prior Publication Data
US 2021/0190659 A1 Jun. 24, 2021

Related U.S. Application Data

(63) Continuation of application No. 16/682,314, filed on Nov. 13, 2019, now Pat. No. 10,908,059.
(Continued)

(51) Int. Cl.
*G01N 15/02* (2006.01)
*G01N 15/06* (2006.01)

(52) U.S. Cl.
CPC ......... *G01N 15/0211* (2013.01); *G01N 15/06* (2013.01); *G01N 15/0266* (2013.01); *G01N 2015/0283* (2013.01)

(58) Field of Classification Search
CPC ...... G01N 35/00; G01N 1/4022; G01N 15/00; G01N 15/04; G01N 2001/4027;
(Continued)

(56) References Cited

U.S. PATENT DOCUMENTS

| 3,444,463 A | 5/1969 | Coulter et al. |
| 3,836,850 A | 9/1974 | Coulter |

(Continued)

FOREIGN PATENT DOCUMENTS

| CN | 101925809 A | * 12/2010 | ......... G01N 15/1459 |
| EP | 2279402 | 8/2015 | |

(Continued)

OTHER PUBLICATIONS

U.S. Appl. No. 12/303,694, filed Dec. 5, 2008.
(Continued)

*Primary Examiner* — Michael P Stafira
(74) *Attorney, Agent, or Firm* — Leydig, Voit & Mayer, Ltd.

(57) ABSTRACT

Provided herein are particle detection systems, and related methods configured to characterize a liquid sample, comprising: a first probe configured to determine a first parameter set of a plurality of first particles in a liquid sample, the first particles characterized by a size characteristic selected from a first size range; wherein the first parameter set comprises a first size distribution and a first concentration; and a second probe configured to determine a second parameter set of one or more second particles in the liquid sample, the second particles being characterized by a size characteristic selected from a second size range; wherein the second parameter set comprises a second size distribution and a second concentration.

29 Claims, 8 Drawing Sheets

Related U.S. Application Data

(60) Provisional application No. 62/768,351, filed on Nov. 16, 2018.

(58) Field of Classification Search
CPC ... G01N 2015/0003; G01N 2015/0277; G01N 2015/1447; G01N 2015/145; G01N 2015/1452; G01N 2015/1454; G01N 2021/052; G01N 2021/6482; G01N 2021/651; G01N 21/0332; G01N 21/552; G01N 21/554; G01N 21/66; G01N 2201/06113; G01N 2201/101; G01N 2291/0289; G01N 23/20; G01N 2333/4739; G01N 2333/912; G01N 2333/91205; G01N 25/02; G01N 2600/00; G01N 27/04; G01N 29/024; G01N 29/032; G01N 29/46; G01N 30/30; G01N 33/544; G01N 33/581; G01N 35/1095; G01N 1/2211; G01N 1/286; G01N 1/405; G01N 1/4077; G01N 1/42; G01N 2001/2886; G01N 2015/0681; G01N 2030/027; G01N 2030/8804; G01N 2333/21; G01N 2333/245; G01N 2333/59; G01N 30/06; G01N 30/08; G01N 30/466; G01N 30/6039; G01N 30/724; G01N 30/88; G01N 33/15; G01N 33/54393; G01N 35/0092; G01J 1/407; G01J 1/429; G01J 1/50
See application file for complete search history.

(56) References Cited

U.S. PATENT DOCUMENTS

| | | | |
|---|---|---|---|
| 4,594,715 | A | 6/1986 | Knollenberg |
| 4,798,465 | A | 1/1989 | Knollenberg |
| 4,893,928 | A | 1/1990 | Knollenberg |
| 5,282,151 | A | 1/1994 | Knollenberg |
| 5,283,199 | A | 2/1994 | Bacon, Jr. et al. |
| 5,671,046 | A | 9/1997 | Knowlton |
| 5,726,753 | A | 3/1998 | Sandberg |
| 5,751,422 | A | 5/1998 | Mitchell |
| 5,805,281 | A | 9/1998 | Knowlton et al. |
| 5,861,950 | A | 1/1999 | Knowlton |
| 5,889,589 | A | 3/1999 | Sandberg |
| 5,903,338 | A | 5/1999 | Mavliev et al. |
| 6,167,107 | A | 12/2000 | Bates |
| 6,246,474 | B1 | 6/2001 | Cerni et al. |
| 6,275,290 | B1 | 8/2001 | Cerni et al. |
| 6,615,679 | B1 | 9/2003 | Knollenberg et al. |
| 6,639,671 | B1 | 10/2003 | Liu |
| 6,657,726 | B1 | 12/2003 | Wang et al. |
| 6,709,311 | B2 | 3/2004 | Cerni |
| 6,710,874 | B2 | 3/2004 | Mavliev |
| 6,794,671 | B2 | 9/2004 | Nicoli et al. |
| 6,859,277 | B2 | 2/2005 | Wagner et al. |
| 6,903,818 | B2 | 6/2005 | Cerni et al. |
| 6,945,090 | B2 | 9/2005 | Rodier |
| 7,030,980 | B1 | 4/2006 | Sehler et al. |
| 7,088,446 | B2 | 8/2006 | Cerni |
| 7,088,447 | B1 | 8/2006 | Bates |
| 7,127,356 | B2 | 10/2006 | Nicoli et al. |
| 7,208,123 | B2 | 4/2007 | Knollenberg et al. |
| 7,230,698 | B2 | 6/2007 | Kurozumi et al. |
| 7,235,214 | B2 | 6/2007 | Rodier et al. |
| RE39,783 | E | 8/2007 | Cerni et al. |
| 7,456,960 | B2 | 11/2008 | Cerni et al. |
| 7,576,857 | B2 | 8/2009 | Wagner |
| 7,667,839 | B2 | 2/2010 | Bates |
| 7,738,101 | B2 | 6/2010 | Mavliev |
| 7,746,469 | B2 | 6/2010 | Shamir et al. |
| 7,796,255 | B2 | 9/2010 | Miller |
| 7,916,293 | B2 | 3/2011 | Mitchell et al. |
| 7,973,929 | B2 | 7/2011 | Bates |
| 7,985,949 | B2 | 7/2011 | Rodier |
| 8,027,035 | B2 | 9/2011 | Mitchell et al. |
| 8,109,129 | B2 | 2/2012 | Gorbunov |
| 8,154,724 | B2 | 4/2012 | Mitchell et al. |
| 8,174,697 | B2 | 5/2012 | Mitchell et al. |
| 8,395,398 | B2 | 3/2013 | Xu et al. |
| 8,427,642 | B2 | 4/2013 | Mitchell et al. |
| 8,800,383 | B2 | 8/2014 | Bates |
| 8,869,593 | B2 | 10/2014 | Gorbunov et al. |
| 9,423,335 | B2 | 8/2016 | Gabriel |
| 9,631,222 | B2 | 4/2017 | Ketcham et al. |
| 9,638,665 | B2 | 5/2017 | Gorbunov |
| 9,682,345 | B2 | 6/2017 | Gromala et al. |
| 9,808,760 | B2 | 11/2017 | Gromala et al. |
| 9,810,558 | B2 | 11/2017 | Bates et al. |
| 9,885,640 | B2 | 2/2018 | Ketcham et al. |
| 9,989,462 | B2 | 6/2018 | Lumpkin et al. |
| 10,197,487 | B2 | 2/2019 | Knollenberg et al. |
| 10,241,024 | B1 | 3/2019 | Mavliev |
| 10,345,200 | B2 | 7/2019 | Scialo et al. |
| 10,371,620 | B2 | 8/2019 | Knollenberg et al. |
| 10,792,694 | B2 | 10/2020 | Gorbunov et al. |
| 10,859,487 | B2 | 12/2020 | Knollenberg et al. |
| 10,908,059 | B2 | 2/2021 | Knollenberg et al. |
| 10,921,229 | B2 | 2/2021 | Shamir |
| 10,928,293 | B2 | 2/2021 | Knollenberg et al. |
| 2003/0032366 | A1* | 2/2003 | Cerni ................... G01N 21/314 451/5 |
| 2003/0089159 | A1 | 5/2003 | Roe |
| 2003/0223063 | A1* | 12/2003 | Hill .................... G01N 15/1427 356/340 |
| 2005/0028593 | A1 | 2/2005 | Rodier |
| 2009/0078862 | A1 | 3/2009 | Rodier et al. |
| 2009/0190128 | A1 | 7/2009 | Cerni et al. |
| 2009/0268202 | A1 | 10/2009 | Wagner |
| 2013/0278921 | A1* | 10/2013 | Choi ................... G01N 21/534 356/51 |
| 2015/0000595 | A1 | 1/2015 | Gorbunov et al. |
| 2015/0038347 | A1* | 2/2015 | Johnson ............... G01N 21/658 506/9 |
| 2015/0259723 | A1 | 9/2015 | Hartigan et al. |
| 2016/0126081 | A1 | 5/2016 | Gorbunov |
| 2016/0139013 | A1 | 5/2016 | Gorbunov |
| 2018/0031464 | A1* | 2/2018 | Norisuye ............... G01N 29/46 |
| 2019/0187041 | A1 | 6/2019 | Mavliev |
| 2019/0250785 | A1 | 8/2019 | Pandolfi et al. |
| 2019/0346345 | A1 | 11/2019 | Scialo et al. |
| 2020/0072729 | A1 | 3/2020 | Lumpkin et al. |
| 2020/0150017 | A1 | 5/2020 | Bates et al. |
| 2020/0150018 | A1 | 5/2020 | Shamir |
| 2020/0158603 | A1 | 5/2020 | Scialo et al. |
| 2020/0240896 | A1 | 7/2020 | Karasikov et al. |
| 2020/0355599 | A1 | 11/2020 | Rodier et al. |
| 2021/0044978 | A1 | 2/2021 | Michaelis et al. |
| 2021/0063349 | A1 | 3/2021 | Rodier et al. |

FOREIGN PATENT DOCUMENTS

| | | | | |
|---|---|---|---|---|
| WO | WO-2007034840 | A1* | 3/2007 | ........... G01N 21/718 |
| WO | WO 2010/004516 | | 1/2010 | |
| WO | WO-2011149526 | A2* | 12/2011 | ............. G16B 99/00 |
| WO | WO-2013013229 | A1* | 1/2013 | ......... G01N 15/0211 |

OTHER PUBLICATIONS

U.S. Appl. No. 14/359,233, filed May 19, 2014.
U.S. Appl. No. 16/682,314, filed Nov. 13, 2019.
U.S. Appl. No. 16/953,987, filed Nov. 20, 2020.
U.S. Appl. No. 17/063,779, filed Oct. 6, 2020.
U.S. Appl. No. 17/063,797, filed Oct. 6, 2020.
U.S. Appl. No. 17/087,906, filed Nov. 3, 2020.
U.S. Appl. No. 17/151,899, filed Jan. 19, 2021.
U.S. Appl. No. 17/153,573, filed Jan. 20, 2021.

(56) References Cited

OTHER PUBLICATIONS

Search Report and Written Opinion, dated Jan. 29, 2020, corresponding to International Application No. PCT/US2019/061115 (filed Nov. 13, 2019), 9 pp.

* cited by examiner

SLURRY MONITOR COUPLING BULK SIZE DISTRIBUTION AND SINGLE PARTICLE DETECTION

CROSS-REFERENCE TO RELATED APPLICATIONS

This application is a continuation application of U.S. application Ser. No. 16/682,314, filed Nov. 13, 2019, which application claims the benefit of priority to U.S. Provisional Patent Application No. 62/768,351 filed Nov. 16, 2018, both of which are incorporated herein by reference in their entireties to the extent not inconsistent herewith.

BACKGROUND OF INVENTION

Chemical Mechanical Planarization (CMP) is a process by which chemical and mechanical forces are combined to polish a surface. CMP plays an important role in semiconductor-device industries, for example. Prior to deposition or fabrication of complex and precisely controlled micro- and nano-scale semiconductor components, a working surface (e.g., a 300 mm wafer) should meet stringent tolerances for flatness and smoothness to maximize quality and reproducibility. The polishing is achieved, at least in part, via a CMP slurry, which includes a large concentration (e.g., $10^7$ to $10^{15}$ particles/mL) of small abrasive particulates suspended and/or dispersed in a pH controlled chemical solution.

The tight tolerances for quality and reproducibility in turn require precise and accurate control of all variables, including the CMP slurry itself, during the planarization. One problematic issue is variation in the concentration and distribution of the abrasive particulates, which influences the rate of planarization. An increase in the number of large particulates can cause scratch and dig defects on the surface of the wafer. As a result, it is important to monitor the size distribution and concentration of the particulates in the CMP slurry.

Conventional technologies for determining the particulate size distribution and concentration in slurries include traditional optical particle counters that may require ex-situ processing of the liquid sample, such as dilution, prior to a measurement. Such approaches may lead to artifacts associated with mishandling or manipulation of the liquid sample, such as pH shock, agglomeration, foreign particulates, and precipitation of the particles on sample container, yielding inaccurate measurements of size distribution and concentration. These conventional approaches typically focus only on the tail of the particle distribution, representing large particles of sizes greater than 200 nm, for example.

Other conventional approaches for determining the particulate size distribution and concentration in slurries include interpolated particle distribution measurements, such as dynamic light scattering and transmission spectroscopy. Such technologies typically involve a bulk scatter or transmission measurement and use of algorithms to approximate a particle size distribution. Such an approach may approximate the particulate size distribution inclusive of small abrasive particulates and large particulates at the tail end of the size distribution. However, such techniques do not provide individual particle measurements and are typically inaccurate at identifying multimodal particle size distributions.

Aerosolized condensation particle counter (CPC) based measurements are another conventional approach for determining the particulate size distribution and concentration in slurries. In these cases, a small volume fraction is extracted from the slurry and is nebulized, dried, and sent through a mobility particle analyzer including a CPC. The extremely small volumes involved make real-time measurements problematic and mask the presence of the larger particles that are present at low concentrations in the original slurry. A typical resolution for such an approach is greater than $10^3$/mL, which is problematic for determining size distribution and concentration of large particles that are present at low concentrations.

Thus, there remains a need for technologies capable of analyzing a slurry, such as a CMP slurry, in real-time and determining the size distributions and concentrations of small particles, which are typically present at high concentrations, and of large particles, which are typically present at low concentrations. Accurate measurements of such a wide range of concentrations and sizes is a significant challenge for any technology today. Disclosed herein are systems and methods that address these and other challenges.

SUMMARY OF THE INVENTION

Provided herein are systems and methods that address challenges associated with characterization of slurries, including CMP slurries. The systems and methods disclosed herein provide for accurate characterization of a full range of particle size distributions and concentrations in a slurry, including those of small particles (e.g., less than or equal to 200 nm diameter) and those of large particles (e.g., greater than 200 nm diameter). The systems and methods disclosed herein may provide for real-time, in-situ, and/or continuous characterization of a slurry. For example, some these systems and methods do not require dilution or other ex-situ manipulations of the fluid sample(s).

In an aspect, a particle detection system, which is configured to characterize a liquid sample, comprises: a first probe configured to determine a first parameter set of a plurality of first particles in said liquid sample, said first particles being characterized by a size characteristic selected from a first size range; wherein said first parameter set comprises a first size distribution and a first concentration; and a second probe configured to determine said second parameter set of one or more second particles in said liquid sample, said second particles being characterized by a size characteristic selected from a second size range; wherein said second parameter set comprises a second size distribution and a second concentration.

In some embodiments, the size characteristic is a diameter. In some embodiments, the size characteristic is a spherical equivalent diameter corresponding to a diameter of a spherical particle exhibiting same or substantially same aerodynamic, hydrodynamic, optical, and/or electrical properties. In some embodiments, the size characteristic corresponds to a particle calibration parameter of a probe. In some embodiments, the size characteristic corresponds to an empirically-derived size characteristic of the particle(s) (e.g., first, second, and/or third particle(s)) based on data from a probe (e.g., first, second, and/or third probe(s)). In some embodiments, the first size range does not overlap with the second size range. In some embodiments, the first size range and the second size range overlap. In an embodiment, the first size range and the second size range overlap; wherein the overlap between the first size range and the second size range is less than or equal to 50%, less than or equal to 20%, less than or equal to 10%, or preferably for some applications less than or equal to 5%, with respect to the first size range or the second size range. In an embodiment, the first size range and the second size range overlap;

wherein the overlap between the first size range and the second size range is less than or equal to 50%, less than or equal to 20%, less than or equal to 10%, or preferably for some applications less than or equal to 5%, with respect to the smaller of the first size range and the second size range (smaller range corresponds to the range having the lowest mathematical result corresponding to the maximum value of the range minus the minimum value of the range). In some embodiments, a first size range is characterized by a size that is substantially less than or substantially equal to 200 nm. In some embodiments, the second size-range is characterized by a size that is substantially greater than 200 nm.

In some embodiments, the system further comprises a third probe, the third probe being configured to determine a third parameter set of a plurality of third particles in said liquid sample, wherein said third particles are characterized by a size characteristic selected from a third size range. In some embodiments, the first size range, the second size range, and the third size range do not overlap with each other. In some embodiments, the third size range does not overlap with the first size range or the second size range. In some embodiments, the first size range does not overlap with the second size range, and the third size range overlaps with at least one of the first size range and the second size range. In some embodiments, at least two of the first size range, the second size range, and the third size range overlap. In an embodiment, at least two of the first size range, the second size range, and the third size range overlap; wherein the overlap between the first size range and the second size range is less than or equal to 50%, less than or equal to 20%, less than or equal to 10%, or preferably for some applications less than or equal to 5%, with respect to the first size range, the second size range, or the third size range. In an embodiment, at least two of the first size range, the second size range, and the third size range overlap. In an embodiment, at least two of the first size range, the second size range, and the third size range overlap; wherein the overlap between the first size range and the second size range is less than or equal to 50%, less than or equal to 20%, less than or equal to 10%, or preferably for some applications less than or equal to 5%, with respect to the smallest of the first size range, the second size range, and the third size range (smallest range corresponds to the range having the lowest mathematical result corresponding to the maximum value of the range minus the minimum value of the range). In some embodiments, the first size range is characterized by a size that is selected from the range of 2 nm to 100 nm and wherein said second size range is characterized by a size that is substantially greater than 500 nm. In some embodiments, the first probe and said second probe is different. In some embodiments, the third probe is different from each of said first probe and said second probe. "Different" refers to probes that are physically distinct, either in terms of physical separation or on the basis of probe type, such as the basis upon which the probe operates.

In some embodiments, each of the first probe and the second probe may be independently selected from the group consisting of a light scattering probe, a light side scattering probe, a highly parallel light scattering probe, a near forward light scattering probe, a dynamic light scattering probe, a light diffraction probe, a laser diffraction probe, a laser scattering probe, an electroresistance probe, an electrostatic probe, a magnetic probe, a magnetoresistance probe, a pressure probe, flowrate probe, an acoustic probe, an ultrasonic probe, a pulsed Doppler acoustic probe, a structured laser beam probe, a light obscuration probe, a interferometry probe, an aerosolized condensation particle counter, a Coulter counter, an electrophoresis-based particle counter, a photoacoustic probe, a laser induced breakdown detection probe, an inductively coupled plasma mass spectrometry (ICP/MS) probe, and any combination thereof. In any system comprising a third probe, the third probe may be selected from the group consisting of a light scattering probe, a light side scattering probe, a highly parallel light scattering probe, a near forward light scattering probe, a dynamic light scattering probe, a light diffraction probe, a laser diffraction probe, a laser scattering probe, an electroresistance probe, an electrostatic probe, a magnetic probe, a magnetoresistance probe, a pressure probe, flowrate probe, an acoustic probe, an ultrasonic probe, a pulsed Doppler acoustic probe, a structured laser beam probe, a light obscuration probe, a interferometry probe, an aerosolized condensation particle counter, a Coulter counter, an electrophoresis-based particle counter, a photoacoustic probe, a laser induced breakdown detection probe, an inductively coupled plasma mass spectrometry (ICP/MS) probe, and any combination thereof.

In some embodiments, the first probe has a concentration detection range selected from the range of $10^3$ particles/mL to $10^{15}$ particles/mL. Optionally, the first probe has a concentration detection range selected from the range of $10^9$ particles/mL to $10^{15}$ particles/mL. In some embodiments, the first probe has a concentration detection range selected from the range of $10^7$ particles/mL to $10^{15}$ particles/mL. In some embodiments, the second probe has a concentration detection range selected from the range of 0.01 particle/mL to $10^5$ particles/mL. Optionally, the second probe has a concentration detection range selected from the range of 0.1 particle/mL to 105 particles/mL, optionally 1 particle/mL to $10^5$ particles/mL, or optionally 1 particle/mL to $10^2$ particles/mL. In some embodiments, the third probe has a concentration detection range selected from the range of 10 particle/mL to $10^7$ particles/mL. In some embodiments, each of said first probe and said second probe are independently characterized by a measurement time that is less than 60 minutes, less than 10 minutes, preferably less than 1 minute, and more preferably for some applications less than 1 second. In some embodiments, each of said first probe and said second probe are independently characterized by a measurement time selected from the range of 1 microsecond to 60 minutes, 0.1 seconds to 10 minutes, or preferably for some applications 0.1 seconds to 1 minute. In an embodiment, "measurement time" is a duration of a data collection and/or data reporting event(s). In some embodiments, at least one of the first probe, the second probe, and the third probe, if present, has an accuracy of at least 90%.

In some embodiments, the first probe and said second probe may be configured to determine said first and said second parameter sets simultaneously. In some embodiments, the first probe and said second probe may be configured to determine said first and said second parameter sets sequentially, in any order. In some embodiments, the system is configured to continuously monitor said first parameter set and said second parameter set. Continuous monitoring may comprise discrete data collection and/or data reporting event(s) at periodic time interval(s) selected from the range of 1 microsecond to 60 minutes. In some embodiments, the system comprises a sample chamber configured to receive said liquid sample continuously.

Any of the systems disclosed herein may comprise a sample chamber configured to receive said liquid sample discretely. Any of the systems disclosed herein may comprise a sample chamber, said sample chamber being configured to be flushed with a reference liquid sample or a blank liquid sample. In any of the systems disclosed herein, a flow rate of said liquid sample in said system may be changeable.

In some embodiments, said first probe is configured to measure said first parameter set in a first liquid fraction of said liquid sample, said first liquid fraction having a volume less than a volume of said liquid sample; and wherein said second probe is configured to measure said second parameter set in a second liquid fraction of said liquid sample, said second liquid fraction having a volume less than a volume of said liquid sample. In some embodiments, a flow rate of said second liquid fraction is different from (e.g., greater than) a flow rate of said first liquid fraction. In some embodiments, said system comprises a first sample chamber having said first liquid fraction and a second sample chamber having said second liquid fraction.

In some embodiments, the system comprises a sample chamber having a volume selected from the range of 1 μl to 1 L, 1 μl to 500 mL, preferably 1 μl to 100 mL, preferably 1 μl to 10 mL, or preferably 1 mL to 10 mL. In some embodiments, the liquid sample has have a volume selected from the range of 1 μl to 500 mL, preferably 1 μl to 100 mL, preferably 1 μl to 10 mL, or preferably 1 mL to 10 mL.

In some embodiments, the liquid sample may be characterized by a flow rate selected from the range of 0.1 to 1000 mL/min. In some embodiments, the liquid sample may be characterized by a flow rate selected from the range of 1 to 1000 mL/min.

In some embodiments, the liquid sample is a slurry, a colloid, a dispersion, or a suspension. In some embodiments, the liquid sample is a slurry. In some embodiments, the liquid sample is a chemical mechanical planarization (CMP) slurry. In some embodiments, the liquid sample is a non-diluted chemical mechanical planarization (CMP) slurry. In some embodiments, the liquid sample is a diluted slurry, such as a diluted CMP slurry. In an embodiment, the particle detection system further comprises a slurry processing tool. In an embodiment, the particle detection system further comprises a slurry dilution tool.

In some embodiments, the plurality of first particles are characterized by a size characteristic selected from the range of 1 nm to 200 nm, optionally 2 nm to 200 nm, or optionally 5 nm to 200 nm, and wherein said one or more second particles are characterized by a size characteristic greater than 200 nm and less than 100 μm.

In an aspect, a method for characterizing a liquid sample comprises steps of: feeding said liquid sample into a particle detection system comprising a first probe and a second probe; measuring a first parameter set in said liquid sample via said first probe; wherein said first parameter set comprises a first size distribution and a first concentration of a plurality of first particles, said first particles being characterized by a size characteristic selected from a first size range; measuring a second parameter set in said liquid sample via said second probe; wherein said second parameter set comprises a second size distribution and a second concentration of one or more second particles, said second particles being characterized by a size characteristic selected from a second size range. In some embodiments of the method disclosed herein, the particle detection system further comprises a third probe; wherein the method further comprises a step of measuring a third parameter set in said liquid sample via said third probe; wherein said third parameter set comprises a third size distribution and a third concentration of a plurality of third particles, said third particles being characterized by a size characteristic selected from a third size range.

In some embodiments, the first size range does not overlap with the second size range. In some embodiments, the first size range and the second size range overlap. In an embodiment, the first size range and the second size range overlap; wherein the overlap between the first size range and the second size range is less than or equal to 50%, less than or equal to 20%, less than or equal to 10%, or preferably for some applications less than or equal to 5%, with respect to the first size range or the second size range. In an embodiment, the first size range and the second size range overlap; wherein the overlap between the first size range and the second size range is less than or equal to 50%, less than or equal to 20%, less than or equal to 10%, or preferably for some applications less than or equal to 5%, with respect to the smaller of the first size range and the second size range (smaller range corresponds to the range having the lowest mathematical result corresponding to the maximum value of the range minus the minimum value of the range). In some embodiments, the first size range is characterized by a size that is substantially less than or substantially equal to 200 nm. In some embodiments, the second size-range is characterized by a size that is substantially greater than 200 nm. In some embodiments, the first size range, the second size range, and the third size range do not overlap with each other. In some embodiments, the third size range does not overlap with the first size range or the second size range. In some embodiments, the first size range does not overlap with the second size range, and the third size range overlaps with at least one of the first size range and the second size range. In some embodiments, at least two of the first size range, the second size range, and the third size range overlap. In an embodiment, at least two of the first size range, the second size range, and the third size range overlap; wherein the overlap between the first size range and the second size range is less than or equal to 50%, less than or equal to 20%, less than or equal to 10%, or preferably for some applications less than or equal to 5%, with respect to the first size range, the second size range, or the third size range. In an embodiment, at least two of the first size range, the second size range, and the third size range overlap. In an embodiment, at least two of the first size range, the second size range, and the third size range overlap; wherein the overlap between the first size range and the second size range is less than or equal to 50%, less than or equal to 20%, less than or equal to 10%, or preferably for some applications less than or equal to 5%, with respect to the smallest of the first size range, the second size range, and the third size range (smallest range corresponds to the range having the lowest mathematical result corresponding to the maximum value of the range minus the minimum value of the range). In some embodiments, the first size range is characterized by a size that is selected from the range of 2 nm to 100 nm and wherein said second size range is characterized by a size that is substantially greater than 500 nm. In some embodiments, the first probe and said second probe is different. In some embodiments, the third probe is different from each of said first probe and said second probe.

In any of the methods disclosed herein, each of the first probe and the second probe may be independently selected from the group consisting of a light scattering probe, a light side scattering probe, a highly parallel light scattering probe, a near forward light scattering probe, a dynamic light scattering probe, a light diffraction probe, a laser diffraction probe, a laser scattering probe, an electroresistance probe, an electrostatic probe, a magnetic probe, a magnetoresistance probe, a pressure probe, flowrate probe, an acoustic probe, an ultrasonic probe, a pulsed Doppler acoustic probe, a structured laser beam probe, a light obscuration probe, a interferometry probe, an aerosolized condensation particle counter, a Coulter counter, an electrophoresis-based particle counter, a photoacoustic probe, a laser induced breakdown detection probe, an inductively coupled plasma mass spectrometry (ICP/MS) probe, and any combination thereof. According to some embodiments of the methods disclosed herein, wherein the particle detection system comprises a third probe, the third probe may be selected from the group consisting of a light scattering probe, a light side scattering probe, a highly parallel light scattering probe, a near forward light scattering probe, a dynamic light scattering probe, a light diffraction probe, a laser diffraction probe, a laser scattering probe, an electroresistance probe, an electrostatic probe, a magnetic probe, a magnetoresistance probe, a pressure probe, flowrate probe, an acoustic probe, an ultrasonic probe, a pulsed Doppler acoustic probe, a structured laser beam probe, a light obscuration probe, a interferometry probe, an aerosolized condensation particle counter, a Coulter counter, an electrophoresis-based particle counter, a photoacoustic probe, a laser induced breakdown detection probe, an inductively coupled plasma mass spectrometry (ICP/MS) probe, and any combination thereof.

In some embodiments, the first probe and said second probe is different. In some embodiments, the first probe has a concentration detection range selected from the range of $10^3$ particles/mL to $10^{15}$ particles/mL. Optionally, the first probe has a concentration detection range selected from the range of $10^9$ particles/mL to $10^{15}$ particles/mL. In some embodiments, the first probe has a concentration detection range selected from the range of $10^7$ particles/mL to $10^{15}$ particles/mL. In some embodiments, the said second probe has a concentration detection range selected from the range of 0.01 particle/mL to $10^5$ particles/mL. Optionally, the second probe has a concentration detection range selected from the range of 0.1 particle/mL to $10^5$ particles/mL, optionally 1 particle/mL to $10^5$ particles/mL, or optionally 1 particle/mL to $10^2$ particles/mL.

In some embodiments, each step of measuring is independent characterized by a measurement time that is less than 60 minutes, less than 10 minutes, preferably less than 1 minutes, more preferably less than 1 second. In some embodiments, each step of measuring is independently characterized by a measurement time selected from the range of 1 microsecond to 60 minutes, or optionally 0.1 seconds to 1 minute. In an embodiment, "measurement time" is a duration of a data collection and/or data reporting event(s).

In some embodiments, the step of feeding is performed continuously. In some embodiments, the step of feeding is performed discretely. In some embodiments, the steps of measuring are performed continuously. In an embodiment, continuously performing a step of measuring comprises discreet data collection and/or data reporting event(s) at periodic time interval(s) selected from the range of 1 microsecond to 60 minutes. In some embodiments, the steps of measuring are performed discretely. In some embodiments, the steps of measuring are performed simultaneously. In some embodiments, the steps of measuring are performed sequentially in any order.

In some embodiments, the method further comprises a step of changing a flow rate of said liquid sample in a sample chamber of said system. In some embodiments, the step of feeding comprises flushing a sample chamber of said system with a reference liquid sample or with a blank liquid sample. In an embodiment of the method disclosed herein, the method further comprises a step of preparing the liquid sample, wherein the step of preparing comprises diluting a slurry, such that the liquid sample is a diluted slurry.

In some embodiments, the method further comprises a step of splitting said liquid sample into a first liquid fraction and a second liquid fraction. In some embodiments, the step of measuring said first parameter set is performed on said first liquid fraction and said step of measuring said second parameter set is performed on said second liquid fraction. In some embodiments, the step of feeding comprises changing a flow rate of said first liquid fraction or said second liquid fraction independently of said second liquid fraction or said first liquid fraction, respectively. In some embodiments, a flow rate of said second liquid fraction is different from (e.g., greater than) a flow rate of said first liquid fraction.

Any of the methods disclosed herein may comprise any one or more embodiments of any of the systems disclosed herein. Any of the systems disclosed herein may comprise any one or more embodiments of the methods disclosed herein.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

DETAILED DESCRIPTION OF THE INVENTION

Figure 1:
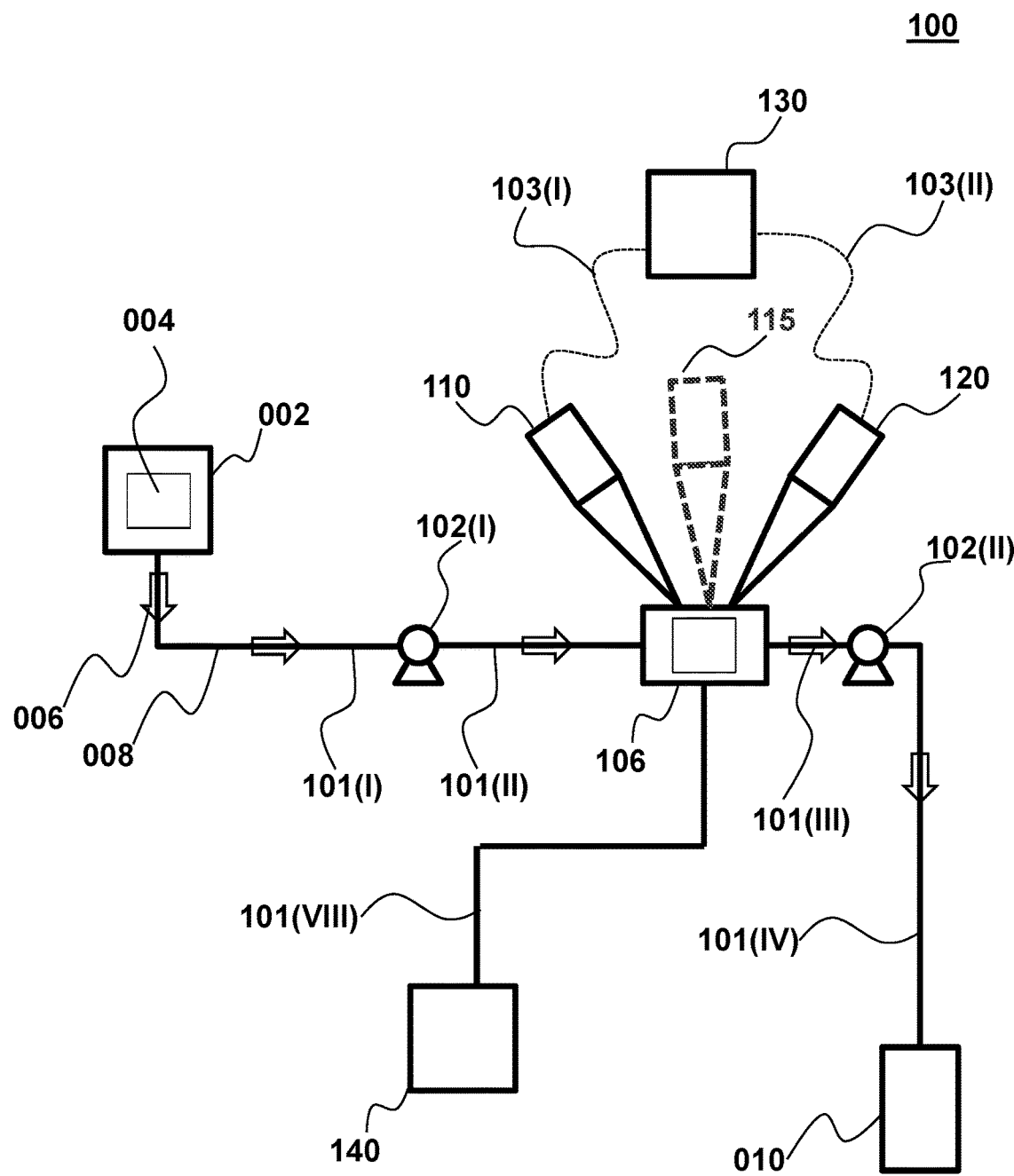
FIG. 1. A schematic of a particle detection system, and associated components, according to an exemplary embodiment of the present invention.

In general, the terms and phrases used herein have their art-recognized meaning, which can be found by reference to standard texts, journal references and contexts known to those skilled in the art. The following definitions are provided to clarify their specific use in the context of the invention.

The term "sample chamber" refers to an at least partially enclosed volume comprising a sample, such as a fluid sample. The fluid sample may be static or dynamic (e.g., flowing or spinning). A sample chamber may be, but is not limited to, a cuvette or a flow cell.

"Flow direction" refers to an axis parallel to the direction the bulk of a fluid is moving when a fluid is flowing. For a fluid flowing through a conduit (e.g., pipe or tube), the flow direction is parallel to the flow path of the bulk of the fluid. Identification of a flow direction may describe a general flow path (e.g., between two end points) without excluding local variations in flow direction. For fluid flowing through a straight flow cell, the flow direction is parallel to the path the bulk of the fluid takes. For fluid flowing through a curved flow cell, the flow direction may be considered tangential to the path the bulk of the fluid takes.

"Optical communication" refers to components that are arranged in a manner that allows light or electromagnetic radiation to transfer between the components.

"Optical source" refers to a device or device component that is capable of delivering electromagnetic radiation to a sample. The term is not limited to visible radiation, such as by a visible light beam, but is used in a broad sense to include any electromagnetic radiation. The optical source may be embodied as a laser or laser array, such as a diode laser, diode laser array, diode laser pumped solid-state laser, LED, LED array, gas phase laser, solid-state laser, or combinations thereof.

The term "electromagnetic radiation" and "light" are used synonymously in the present description and refer to waves of electric and magnetic fields. Electromagnetic radiation useful for the methods of the present invention includes, but is not limited to ultraviolet light, visible light, infrared light, or any combination of these having wavelengths between about 100 nanometers (nm) to about 15 microns (μm).

The term "slurry," as used herein, refers to a liquid having solid particles dispersed and/or suspended therein.

The term "suspended" with regard to solid particles in a fluid refers to a suspension, or a mixture of solid particles in a fluid wherein the solid particles are thermodynamically favored to precipitate or sediment out of the fluid solution. The suspension may appear uniform, particularly after agitation, (i.e., solid particles macroscopically evenly distributed in the fluid). The suspension is typically microscopically heterogeneous. In an embodiment, solid particles in a suspension have a size characteristic (e.g., a diameter) corresponding to one micrometer or larger, including up to 1 cm, and any sub-ranges thereof. The solid particles of a suspension may be visible to the human eye. Solid particles in a suspension may appear uniformly mixed, particularly after agitation, but are undergoing sedimentation. The solid particles may remain suspended in the solution on short time scales (e.g., less than one minute) or indefinitely kinetically (i.e., in contrast to thermodynamically). As used herein, solid particles suspended in a fluid may refer to particles fully sedimented (e.g., lead shot particles settled to the bottom of a container with a highly viscous liquid such as syrup that hinders movement of the particles). As desired, a physical barrier may be positioned in the container so as to confine particles to a specific location, particularly for fluids through which the particles may otherwise readily traverse.

The term "dispersed" in regard to solid particles in a fluid refers to a dispersion, or a microscopically homogenous, or uniform, mixture of solid particles in a fluid. Similarly to a suspension, a dispersion may be thermodynamically favored to segregate by sedimentation but wherein sedimentation is kinetically slowed or prevented. As used herein, a dispersion is a microscopically homogenous mixture having solid particles therein. One example of a dispersion is a colloid.

The term "particles" or "particulates" refers to small solid objects that may be dispersed and/or suspended in a fluid. For example, a slurry includes particles dispersed and/or suspended therein. The terms "particle" and "particulate" may be used interchangeably. In some embodiments, the term "particle" refers to an individual primary particle. In some embodiments, the term "particle" refers to an individual primary particle, an individual aggregate, or an individual agglomerate. Aggregates and agglomerates may be referred to as secondary particles because they comprise primary particles. An agglomerate comprises at least one primary particle and/or at least one aggregate. In an embodiment, an agglomerate is characterized by a total specific surface area that is substantially equivalent to the sum of the specific surface area of each of the particles and/or aggregates which constitute the agglomerate. For example, primary particles and/or aggregates of an agglomerate may be held together by adhesion or other weak physical interactions. In an embodiment, an aggregate is characterized by a total specific surface area that is substantially less than the sum of the specific surface area of each of the individual primary particles which constitute the aggregate. In an example, an aggregate is a plurality of primary particles sintered to each other. Particles may comprise a material including, but not limited to, a metal, a metal alloy, a ceramic (e.g., metal oxide), a semiconductor, carbon, or any combination of these. A particle may be intentionally or unintentionally added to a liquid. An unintentionally added particle may be the result of contamination or the result of undesired side reaction. A particle can be any material created by the act of friction, for example, when two surfaces come into mechanical contact and there is mechanical movement. Particles that are agglomerates and/or aggregates include, but are not limited to, dust, dirt, smoke, ash, water, soot, metal, minerals, or any combination of these or other materials or contaminants. A particle may also be a biological particle, such as viruses, spores and microorganisms including bacteria, fungi, archaea, protists, other single cell microorganisms and specifically those microorganisms having a size on the order of 1-15 μm. In an embodiment, a particle may absorb and/or scatter light, such that it is detectable by an optical particle counter. In an embodiment, "particle" is intended to be exclusive of the individual atoms or molecules of a carrier fluid, for example, water molecules, process chemical molecules, oxygen molecules, helium atoms, nitrogen molecules, etc.

The term "size characteristic" refers to a property, or set of properties, of a particle that directly or indirectly relates to a size attribute. According to some embodiments, a size characteristic corresponds to an empirically-derived size characteristic of a particle(s) being detected, such as a size characteristic based on, determined by, or corresponding to data from any of the probes disclosed herein or other art-known probes capable of detecting particles (e.g., a size characteristic corresponding to a spherical particle exhibiting similar or substantially same properties, such as aerodynamic, hydrodynamic, optical, and/or electrical properties, as the particle(s) being detected). According to some embodiments, a size characteristic corresponds to a physical dimension, such as a cross-sectional size (e.g., length, width, thickness, diameter).

The term "probe" refers to a system capable of detecting particles suspended and/or dispersed in a fluid, a system capable of determining the sizes of particles suspended and/or dispersed in a fluid, system capable of counting particles suspended and/or dispersed in a fluid, system capable of classification of particles suspended and/or dispersed in a fluid, or any combination of these. Exemplary probes include, but are not limited to, a light scattering probe, a light side scattering probe, a highly parallel light scattering probe, a near forward light scattering probe, a dynamic light scattering probe, a light diffraction probe, a laser diffraction probe, a laser scattering probe, an electroresistance probe, an electrostatic probe, a magnetic probe, a magnetoresistance probe, a pressure probe, flowrate probe, an acoustic probe, an ultrasonic probe, a pulsed Doppler acoustic probe, a structured laser beam probe, a light obscuration probe, a interferometry probe, an aerosolized condensation particle counter, a Coulter counter, an electrophoresis-based particle counter, a photoacoustic probe, a laser induced breakdown detection probe, an inductively coupled plasma mass spectrometry (ICP/MS) probe, and any combinations of these.

An exemplary probe is an optical particle counter, which is comprised of several components, such as a source for generating a beam of electromagnetic radiation, optics for directing the beam into a region where a fluid sample is flowing, for example a liquid or gas flowing through a flow cell. A typical optical liquid particle counter is also comprised of a photodetector, such as a two-dimensional optical detector, and collection optics for detecting electromagnetic radiation which is obscured, scattered or emitted by particles which pass through the beam, and other electronics for the processing and analysis of electrical signals produced by the photodetector including current to voltage converters and signal filtering and amplification electronics.

"Condensation particle counter" and "condensation nuclei counter" are used synonymously herein and refer to systems or devices with a particle counter (as defined herein) and a condensation system for enlarging the perceived volume of particles by the particle counter by condensing a condensate on the surface of the particles. In some embodiments, the particle counter and condensation system are combined into a single system or unit and in some cases they comprise two or more units or devices. In an embodiment, for example, the particle counter is an optical particle counter and is included with a condensation system in a single device.

The term "concentration detection range" refers to a range of concentration values detectable by a probe. In an embodiment, the low end of a concentration detection range corresponds to a signal-to-noise ratio that is substantially less than or substantially equal to 1. In an embodiment, the high end of a concentration detection range corresponds to when a probability of two particles being counted as one particle (e.g., two particles crossing a light beam of an optical probe simultaneously) is greater than 5%, preferably for some applications greater than 10%, and still more preferably for some applications greater than 20%.

"Fluid communication" refers to the arrangement of two or more objects such that a fluid can be transported to, past, through or from one object to another. For example, in some embodiments two objects are in fluid communication with one another if a fluid flow path is provided directly between the two objects. In some embodiments, two objects are in fluid communication with one another if a fluid flow path is provided indirectly between the two objects, such as by including one or more other objects or flow paths between the two objects. In one embodiment, two objects present in a body of fluid are not necessarily in fluid communication with one another unless fluid from the first object is drawn to, past and/or through the second object, such as along a flow path.

"Optical communication" refers to components which are arranged in a manner that allows light to transfer between the components.

The terms "flow rate" and "flowrate" may be used interchangeably and refer to an amount of fluid flowing past a specified point or through a specified area, such as through intake apertures or a fluid outlet of a particle impactor. In one embodiment a flow rate refers to a mass flow rate, i.e., a mass of the fluid flowing past a specified point or through a specified area. In one embodiment a flow rate is a volumetric flow rate, i.e., a volume of the fluid flowing past a specified point or through a specified area. The flow rate may be controlled by any means known in the art, including by flow controllers, pumps, vacuum sources, valves, solenoids and the like that are fluidically integrated to any of the devices or methods described herein.

The term "characterizing" refers to detecting, identifying, sensing, measuring, and/or determining information corresponding to particles dispersed and/or suspended in a liquid. In some embodiments, characterizing refers to determining size distribution and concentration of particles, or a class of particles (e.g., small or large). As used herein, the term to "determine" comprises to measure.

In an embodiment, the term "measurement time" refers to the time it takes for a probe to complete one measurement of a parameter set corresponding to particles, or a class of particles, in a liquid. In an embodiment, "measurement time" is a duration of a data collection and/or data reporting event(s).

The term "substantially" refers to a property that is within 20%, within 10%, within 5%, within 1%, or is equivalent to a reference property. The term "substantially equal", "substantially equivalent", or "substantially unchanged", when used in conjunction with a reference value describing a property or condition, refers to a value that is within 20%, within 10%, optionally within 5%, optionally within 1%, optionally within 0.1%, or preferably for some applications is equivalent to the provided reference value. For example, a particle size is substantially equal to 10 nm if it the size of the particle is within 20%, within 10%, optionally within 5%, optionally within 1%, or optionally equal to 10 nm. The term "substantially greater", when used in conjunction with a reference value describing a property or condition, refers to a value that is at least 2%, optionally at least 5%, optionally at least 10% greater, or optionally at least 20% greater than the provided reference value. The term "substantially less", when used in conjunction with a reference value describing a property or condition, refers to a value that is at least 2%, optionally at least 5%, optionally at least 10%, or optionally at least 20% less than the provided reference value.

In the following description, numerous specific details of the devices, device components and methods of the present invention are set forth in order to provide a thorough explanation of the precise nature of the invention. It will be apparent, however, to those of skill in the art that the invention can be practiced without these specific details.

Figure 3:
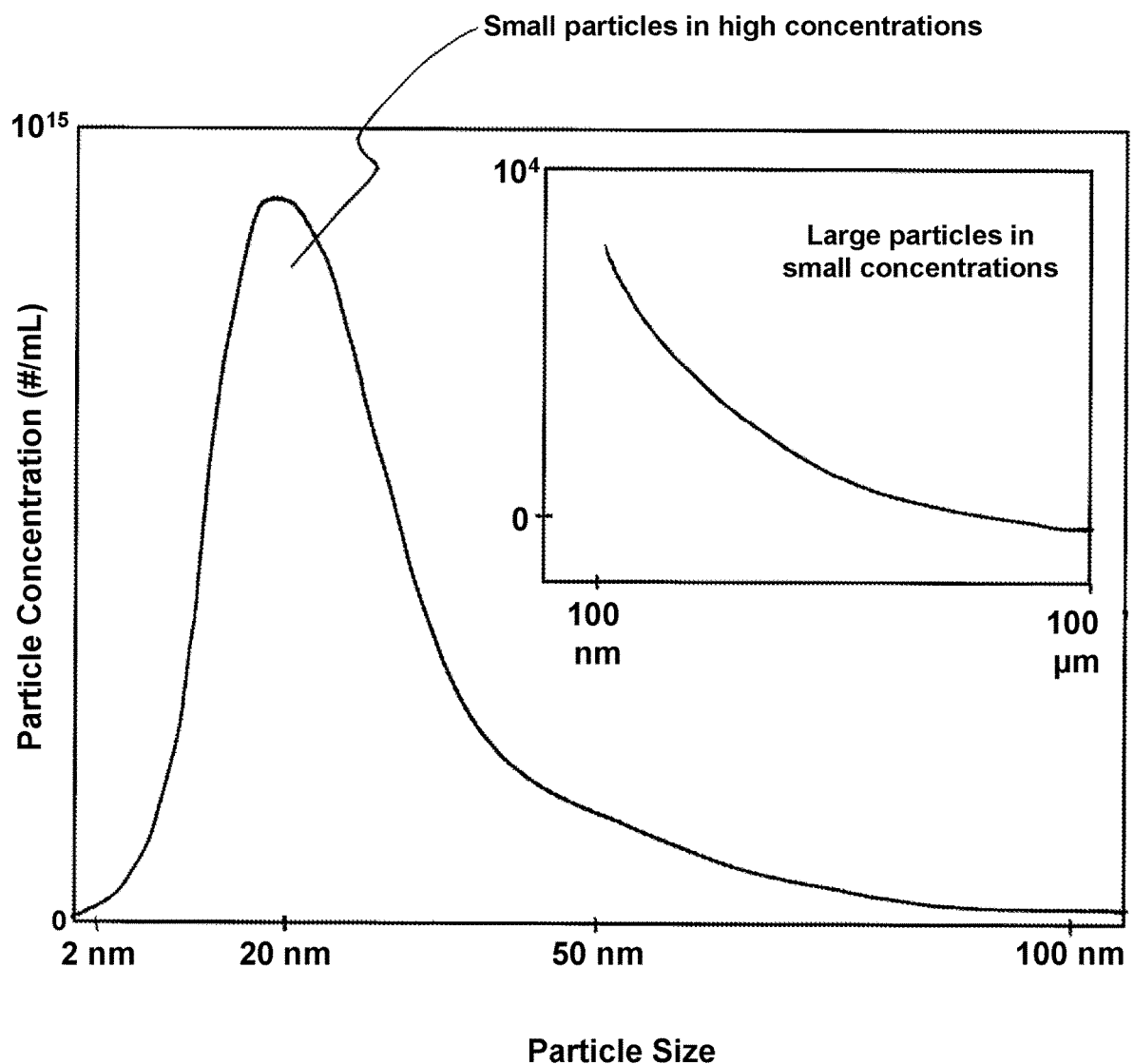
FIG. 3. Illustration showing a plot of a particle concentration (#/mL) versus particle size (nm) for a simulated exemplary slurry. The inset illustrates a view of particle concentration in the 100 nm to 100 μm range.

Various conventional technologies may be suited for a limited scope of characterization of a slurry. FIG. 3 is an illustrated plot of particle concentration (#/mL) versus particle size (nm) for a simulated particle distribution in a slurry, where the inset plot shows the same data but with adjusted concentration (y-axis) and size (x-axis) scales for clarity. The illustrated distribution shows that a slurry may have a high concentration of smaller particles and relatively low concentrations of larger particles. This illustrates technical challenges associated with characterizing such a slurry. Conventionally, a system or method configured to characterize the high concentration of small particles lacks the necessary capability to characterize the large particle distribution. Likewise, conventionally, a system or method configured to characterize the low concentrations of large particles may be insensitive to particles having a smaller size characteristic (e.g., diameter) and/or may require dilution due to oversaturation of the detection system as a result of the un-diluted high concentration of small particles. For example, as noted above, certain conventional approaches require ex-situ processing of the liquid sample, such as dilution, prior to a measurement. Such approaches may lead to artifacts associated with mishandling or manipulation of the liquid sample, such as pH shock, agglomeration, foreign particulates, and precipitation of the particles on sample container, yielding inaccurate measurements of size distribution and concentration. Some approaches focus only on the tail of the particle distribution, representing large particles of sizes greater than 200 nm, or more commonly greater than 500 nm, but are unable to characterize the size distribution and/or concentration of the higher fraction of smaller particles. Examples of the latter include PMS LiQuilaz® coupled with dilution, Particle Sizing Systems Accusizer®, and Vantage SlurryScope™. Other conventional approaches approximate a broader particulate size distribution range, but may not provide individual particle measurements and may be inaccurate at identifying multimodal particle size distributions. Products with the latter issues include certain dynamic light scattering systems. Yet other conventional approaches utilize a condensation particle counter (CPC) and require extremely small volumes of samples which are nebulized, dried, and sent through a mobility particle analyzer including a CPC. The extremely small volumes involved make real-time measurements problematic and mask the presence of the larger particles that are present at low concentrations in the original slurry.

Disclosed herein are systems and methods that address challenges associated with characterization of slurries, including CMP slurries. The systems and methods disclosed herein provide for accurate characterization of a full range of particle size distributions and concentrations in a slurry, including those of small particles (e.g., size characteristic, such as diameter, corresponding to less than or equal to 200 nm and optionally down to 1 nm) and those of large particles (e.g., size characteristic, such as diameter, corresponding to greater than 200 nm and optionally up to 200 μm). The systems and methods disclosed herein may provide for real-time, in-situ, and/or continuous characterization of a slurry. For example, some these systems and methods do not require dilution or other ex-situ manipulations. In some embodiments, however, these systems and methods may be compatible with dilution or other ex-situ manipulations.

To properly control the CMP process and minimize defects, a metrology solution able to accurately characterize small concentrations of yield-impacting large particles (e.g., size characteristic, such as diameter, corresponding to greater than 200 nm) while providing a real-time measurement of the bulk slurry abrasive concentration and particle distribution (e.g., size characteristic, such as diameter, corresponding to between 5 nm and 200 nm) is important for industries, particularly semiconductor electronics industries. Individual particle, $10^0$ to $10^1$, or preferably for some applications, $10^0$ to $10^2$, particle concentration detection range, per mL, is useful for the larger particles while 109 to $10^{15}$ concentration detection range, per mL, is useful for the main abrasive particle concentrations. There is currently no known single technology able to provide this dynamic range of sizing sensitivity coupled with needed concentration detection ranges.

Provided herein are systems and methods having combined advantages of multiple probes, allowing for determination of the larger particle concentration and distribution and determination of the bulk abrasive particulate concentration and distribution in a single real-time technology.

For example, the systems and methods disclosed herein include a first probe and a second probe, each probe independently selected from the group consisting of a light scattering probe, a light side scattering probe, a highly parallel light scattering probe, a near forward light scattering probe, a dynamic light scattering probe, a light diffraction probe, a laser diffraction probe, a laser scattering probe, an electroresistance probe, an electrostatic probe, a magnetic probe, a magnetoresistance probe, a pressure probe, flowrate probe, an acoustic probe, an ultrasonic probe, a pulsed Doppler acoustic probe, a structured laser beam probe, a light obscuration probe, a interferometry probe, an aerosolized condensation particle counter, a Coulter counter, an electrophoresis-based particle counter, a photoacoustic probe, a laser induced breakdown detection probe, an inductively coupled plasma mass spectrometry (ICP/MS) probe, and any combination thereof.

For example, a first probe may be configured to determine a plurality of parameters characterizing a subset of the particle distribution, such as concentration and size distribution corresponding to small particles of a particular size range; and, for example, a second probe may be configured to determine a plurality of parameters characterizing a subset of the particle distribution, such as concentration and size distribution corresponding to large particles of a particular size range.

For example, a first probe for the measurement of high concentrations of small particles in a slurry, such as a CMP slurry, includes one of the following systems or technologies: light scattering (e.g., side scatter and highly parallel approaches); electronic or resistivity based measurements; electrostatic based measurements; structured laser beam particle sensing; interferometric characterization; ultrasonic or acoustic technologies (e.g., pulsed Doppler techniques); aerosolized condensation particle counter (CPC); dynamic light scattering (DLS); photoacoustic detection; laser induced breakdown detection; inductively coupled plasma mass spectrometry (ICP/MS); or any combination of these.

For example, a second probe for the measurement of low concentrations of large particles in a slurry, such as a CMP slurry, includes one of the following systems or technologies: light obscuration; near forward light scattering; combination of obscuration and scattering; structured laser beam particle sensing; ultrasonic or acoustic technologies; interferometric characterization; electronic or resistivity based measurement; electrostatic based measurement; photoacoustic detection; laser induced breakdown detection; inductively coupled plasma mass spectrometry (ICP/MS); or a combination of these. The first and second probes may be independently selected depending on the application of interest, such as particle properties. Accordingly, the probes may be different or may be the same, with each probe configured to detect desired particle parameters.

FIG. 1 is a diagram corresponding to an exemplary particle detection system 100, according to certain embodiments. Additional elements, which may be associated with or connected to particle detection system 100 are also shown in FIG. 1. In some embodiments, particle detection system 100 includes: one or more pumps (e.g., pump 102(I) and/or pump 102(II)), a sample chamber 106, a first probe 110, a second probe 120, and optionally a third probe 115. Components may be in fluid communication with another component via one or more fluid conduits, such as fluid conduits 101(I), 101(II), 101(III), and 101(IV). In some embodiments, particle detection system 100 further includes a controller 130. Controller 130 may include a processor, an analog-to-digital signal converter, memory (volatile and/or non-volatile computer-readable storage medium), machine-readable instructions stored on the memory, input devices (e.g., keyboard and mouse), electronics configured for two-way communication with the first and second probes, and/or a display. Controller 130 may be in electrical communication connected with first probe 110 via electrical conduit 103(I) and may be in electrical communication with second probe 120 via electrical conduit 103(II). In some embodiments, particle detection system 100 includes pump 102(I). Particle detection system 100 may include pump 102(I), pump 102(II), or both pumps 102(I) and 102(II) for directing a slurry from slurry source 002, through sample chamber 106, and out of sample chamber 106. In some embodiments, particle detection system 100 includes fluid conduit 101(I), for operably connecting slurry source 002 to particle detection system 100. In some embodiments, particle detection system 100 includes slurry source 002. In FIG. 1, slurry flow direction is indicated via flow direction arrows 006.

Particle detection system 100 may further include a condensation system (not shown) for enlarging the perceived volume of particles by a probe via condensing a condensate on the surface of the particles.

In an illustrative embodiment of particle detection system 100, fluid conduit 101(I) is operably connected to slurry source 002. For example, slurry source 002 may be part of a CMP process setup. Particle detection system 100 extracts or redirects a liquid sample 008 of slurry 004. Pump 102(I) is in fluid communication with conduits 101(I) and 101(II) and forces flow of a liquid sample 008 of slurry 004 from slurry source 002 to sample chamber 106. Particle detection system 100 includes a first probe 110 configured to determine a first parameter set of a plurality of first particles in liquid sample 008. The parameter set may include a size distribution and a concentration, such that first probe 110 is configured to determine a particle size distribution of the plurality of first particles in sample 008 and a concentration of the plurality of first particles in sample 008. Particle detection system 100 further includes a second probe 120 configured to determine a second parameter set of one or more second particles in liquid sample 008 For example, second probe 120 is configured to determine a particle size distribution of the one or more second particles in sample 008 and a concentration of the one or more second particles in sample 008. For example, first particles are those having a size characteristic, such as diameter, corresponding to less than or equal to 200 nm. For example, second particles are those having a size characteristic, such as diameter, corresponding to greater than 200 nm. First and second probes 110 and 120 are in electrical communication with controller 130. Controller 130 may be external to particle detection system 100 or at least a portion of controller 130 (e.g., an analog-to-digital signal converter) may be included in particle detection system 100. Liquid sample 008 flows out of chamber 106 via fluid conduit, such as conduit(s) 101(III) and/or 101(IV). Optionally, pump 102(II) forces sample 008 from sample chamber 106 and to processing assembly 010. Processing assembly 010 may be a waste collector for discarding sample 008 after characterization. Alternatively, processing assembly 010 may include additional characterization or treatment systems. In some embodiments, sample 008 is directly or indirectly recycled into slurry source 002 via processing assembly 010. In some embodiments, processing assembly 010 is a slurry process tool.

Particle detection system 100 may controllably change the flow rate of sample 008 through sample chamber 106, for example via a pump such as pump 102(I) and/or 102(II). The flow rate may be dynamically varied during characterization of sample 008. For example, the flow rate may be increased to improve range and/or accuracy of the particle size distribution and concentration measurement corresponding to the second particles or the flow may be decreased to improve detection range and/or accuracy of the particle size distribution and concentration measurement corresponding to the first particles. In some embodiments, particle detection system 100 may be configured for batch measurements, such that sample chamber 106 receives sample 008 discretely rather than continuously.

In some embodiments, sample chamber 106 may be flushed with a reference and/or a blank liquid sample. For example, sample chamber 106 is flushed via fluid conduit(s) 101(VII) with a reference liquid or blank liquid from liquid source 140. A reference liquid refers to a liquid having a known particle size distribution and known particle concentration. A blank liquid refers to a liquid substantially free of particles. Flushing sample chamber 106 may provide a means to clean sample chamber 106 and minimize precipitation of particles on the internal walls of sample chamber 106 or other elements. Flushing sample chamber 106 with a reference sample may provide a means to calibrate or verify calibration status of either one or both of the probes.

Each of first probe 110 and second probe 120 may independently comprise elements that provide for the capability of the respective probe to characterize the liquid sample as described above. For example, in the case of an electromagnetic radiation-based probe (e.g., light obscuration, structured laser beam, optical scattering, etc.), the probe may comprise an optical source, an optical assembly (e.g., refractometer or beam shaping optical assembly), an optical collection system to collect transmitted, scattered, and/or emitted electromagnetic radiation, and a detection system. Each of first probe 110 and second probe 120, or elements thereof, is operably connected to or associated with sample chamber 106 in a way that provides for intended characterization of liquid sample 006 without adversely affecting the functionality of the other probe, respectively. First probe 110 and second probe 120 may share an energy source (e.g., an optical source) but have different detection and/or signal processing elements. First probe 110 and second 120 may have different energy sources but share detection and/or signal processing elements.

Figure 2:
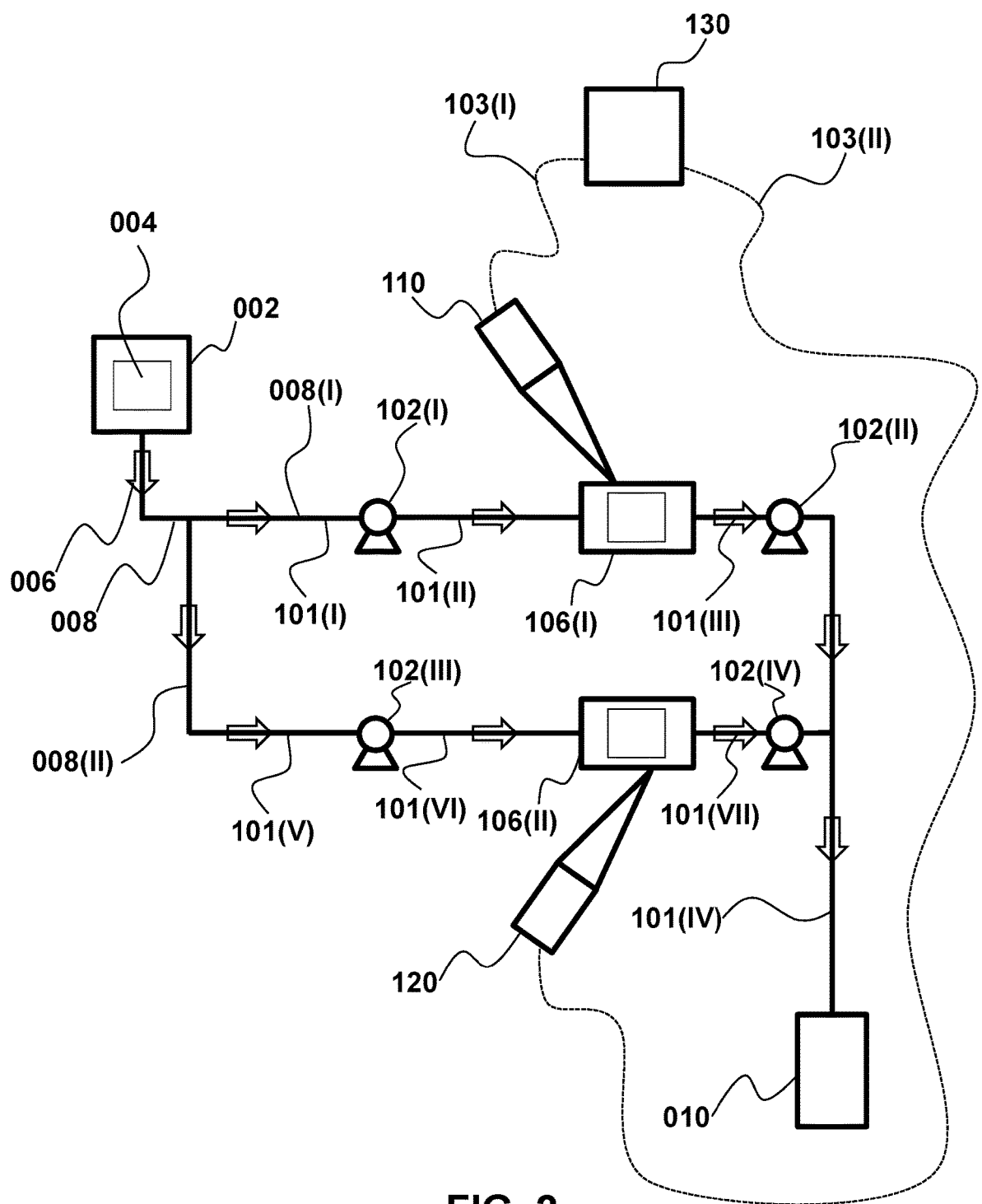
FIG. 2. A schematic of a particle detection system, and associated components, according to an exemplary embodiment of the present invention. In this embodiment, the first probe analyzes a first liquid fraction and the second probe analyzes a second liquid fraction.

FIG. 2 is a diagram of a particle detection system 200. Particle detection system 200 includes a first sample chamber 106(I) and a second sample chamber 106(II). Liquid sample 008 is split into a first liquid fraction 008(I) and a second liquid fraction 008(II). Particle detection system 200 is configured to feed first liquid fraction 008(I) into first sample chamber 106(I) and to feed second liquid fraction 008(II) into second sample chamber 106(II). First probe 110 is configured to characterize first liquid fraction 008(I) in first sample chamber 106(I). Second probe 120 is configured to characterize second liquid fraction 008(II) in second sample chamber 106(II). Particle detection system 200 may independently vary the flow rate of each of first and second liquid fractions 008(I) and 008(II). For example, the flow rate of second liquid fraction 008(II) through second sample chamber 106(II) may be greater than the flow rate of first liquid fraction 008(I) through first sample chamber 106(I). Varying the flow rate of the two different liquid fractions may be useful, for example, to improve detection range and/or accuracy of characterization of the second particle distribution and concentration by increasing the respective flow rate, thereby increasing the detected particle count. The varying of flow rates may be accomplished by control of one or more pumps 102(I)-102(IV) and/or by various flow control elements such as valves, switches and/or flow-controllers. Meanwhile, improving detection range and/or accuracy of characterization of the first particle distribution and concentration may be improved by decreasing the respective flowrate depending on the detection sensitivity of the respective probe (e.g., decrease particle count to avoid saturating the detection system).

Particle detection systems disclosed herein may have any combination of the features and elements corresponding to particle detections systems 100 and 200 described above.

Figure 4A:
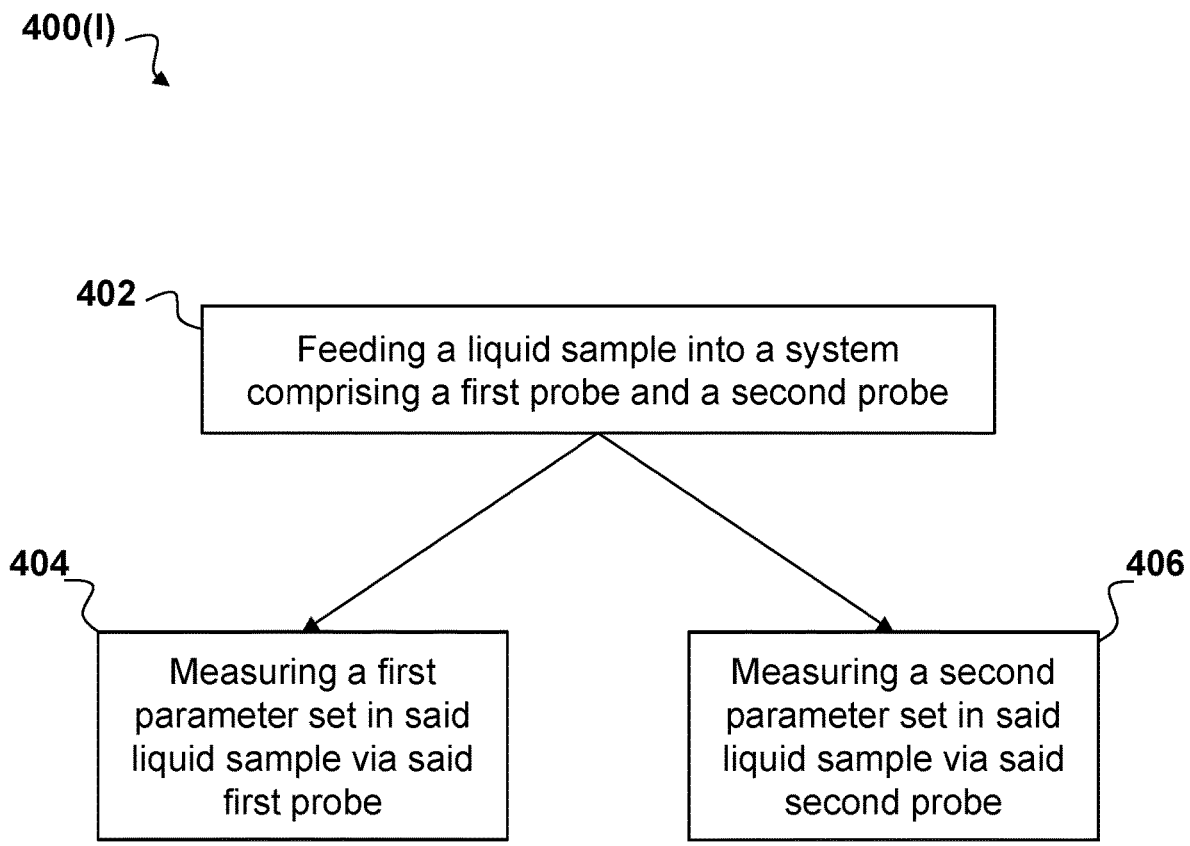
FIGS. 4A-4C. Flowcharts showing exemplary embodiments of a method for characterizing a liquid sample.
Figure 4B:
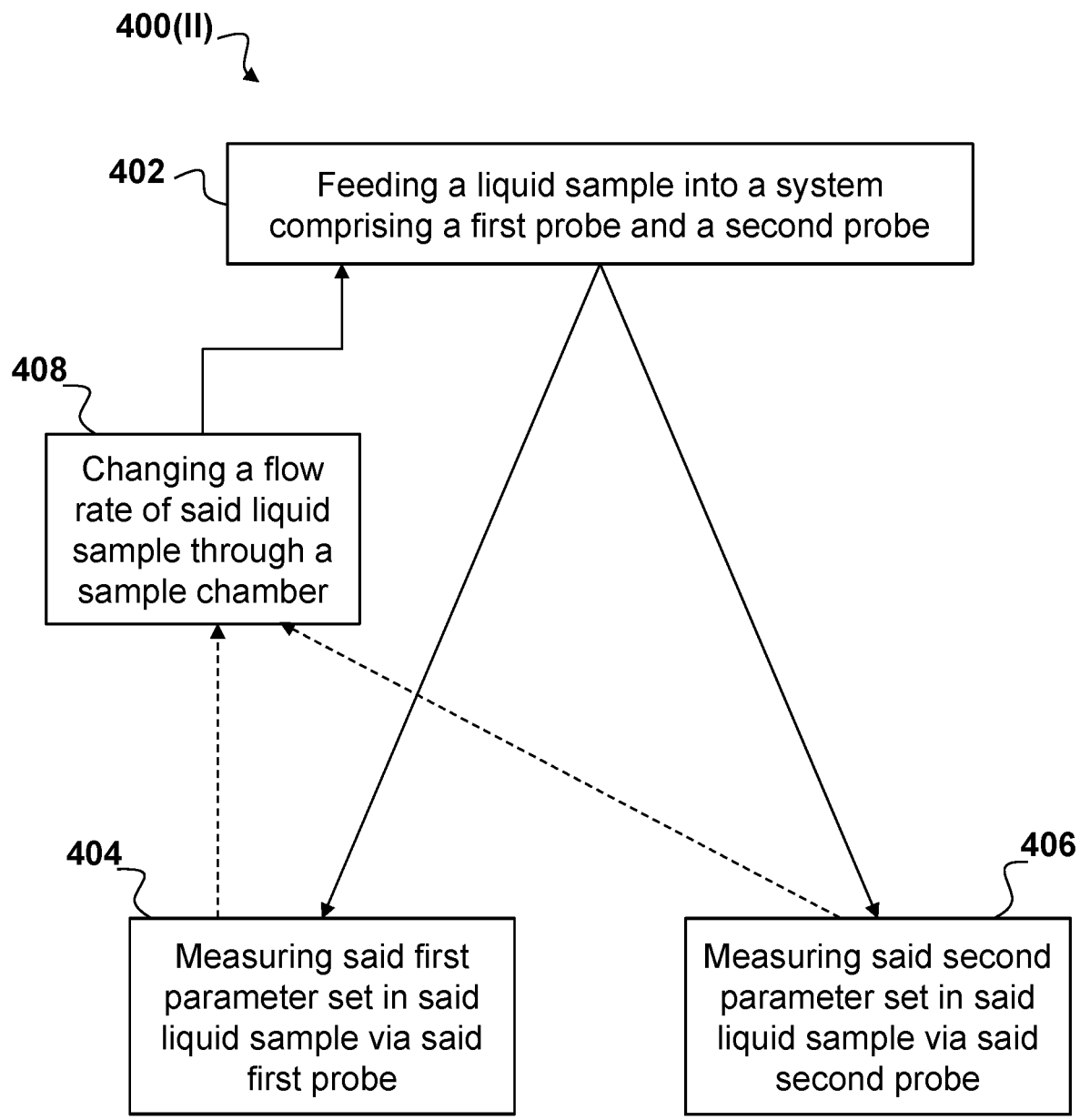
Figure 4C:
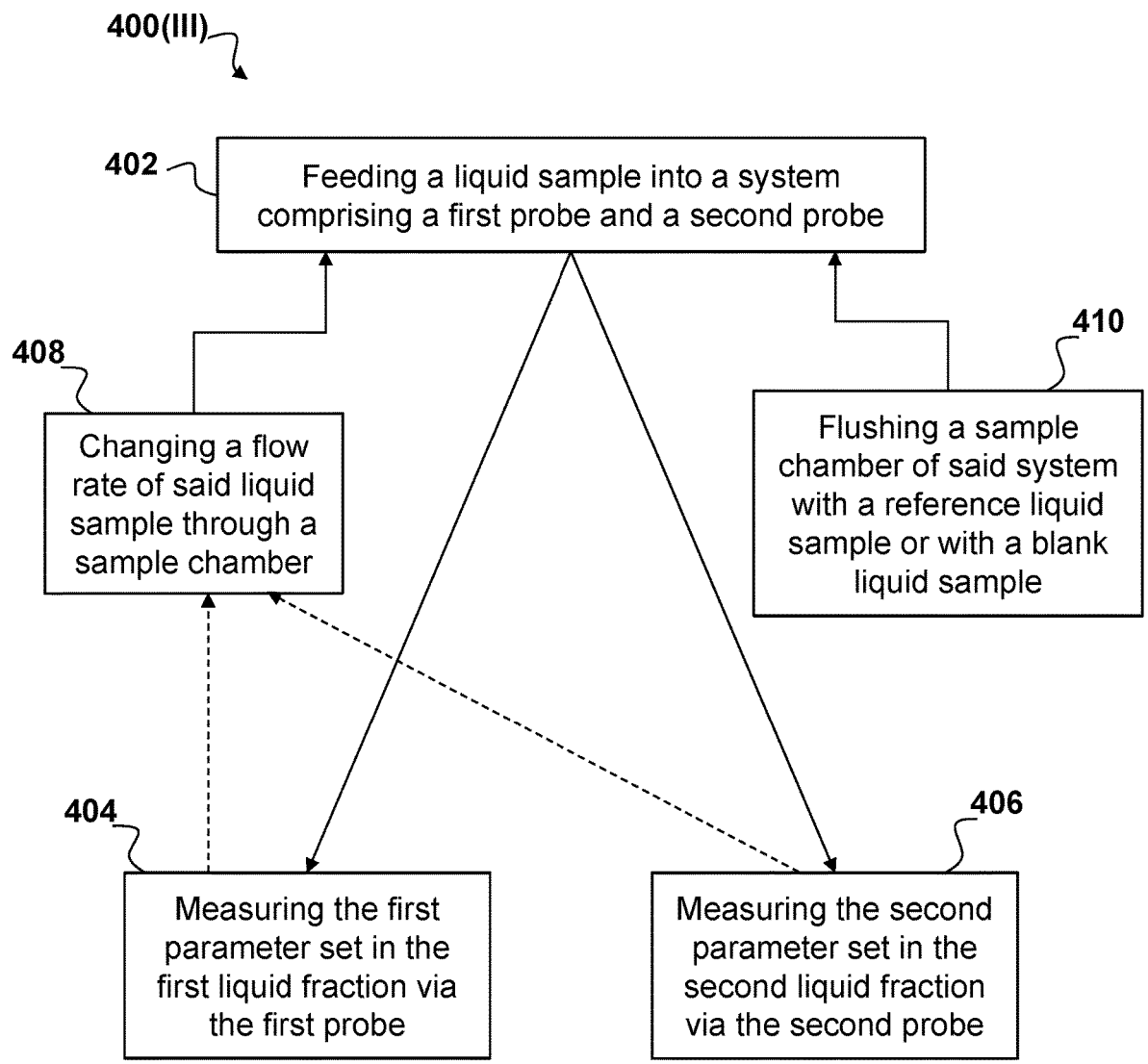

FIGS. 4A-4C illustrate exemplary embodiments of a method 400 for characterizing a liquid sample. FIG. 4A is a flowchart of method 400(I). Method 400(I) includes step 402, in which a liquid sample is fed into a system comprising a first probe and a second probe. The system, which comprises the first probe and the second probe, is a particle detection system, such as particle detection system 100, and the probes may be first probe 110 and second probe 120. For example, the liquid sample is liquid sample 008 that is fed into sample chamber 106. In step 404, a first parameter set in the liquid sample is measured via the first probe. The first parameter set is, for example, a first size distribution and a first concentration of a plurality of first particles in the liquid sample. In step 406, a second parameter set in the liquid sample is measured via the second probe. The second parameter set is, for example, a second size distribution and a second concentration of one or more second particles in the liquid sample. Steps 404 and 406 may be performed simultaneously or sequentially in any order. If, for example, the function of the first probe may adversely affect the measurement performed by the second probe, then steps 404 and 406 may be performed sequentially. Typically, steps 404 and 406 are performed simultaneously. For example, a single measurement by the first probe and/or by the second probe may be completed within 1 minute, optionally within 1 second, and optionally within 0.5 seconds. Each measurement corresponding to each of step 404 or step 406 yields a data signal (e.g., a data analog signal) that may be converted to a data set by controller 130. Each of steps 404 and 406 may independently be repeated, for example to optimize measurement detection range and/or accuracy and signal-to-noise ratio. Data from any number of the repeated measurements, for each probe respectively, may be processed (e.g., by a controller such as controller 130) to produce a single data set. For example, step 404 may be completed within 1 second and be repeated 10 times in order to increase the signal-to-noise ratio via processing of data corresponding to the 10 measurements of step 404 (e.g., via averaging the 10 datasets from the 10 repetitions of step 404). FIG. 4B is a flowchart of method 400(II) for characterizing a liquid sample.

Method 400(II) includes method 400(I) and further includes step 408. In step 408, a flow rate of the liquid sample (e.g., sample 008) through a sample chamber (e.g., sample chamber 106) is changed. Step 408 may be repeated more than once. For example, the liquid sample's flow rate may be increased, then decreased, and then increased again. For example, the flow rate may be changed to optimize the detection range and/or accuracy and signal-to-noise ratio of the first probe's and/or the second probe's measurement(s). Repetition of step 408, if performed more than once, may be performed at any time interval, such as a time interval of 1 second or less, optionally 1 minute or less, and optionally 10 minutes or less. As desired, the systems and methods may incorporate feedback control, as indicated by dashed lines. For example, the flow-rate is optionally controlled, at least in part, based on the data generated by measuring steps 404 and/or 406. For example, if few particles are measured, the flow-rate may be increased, and correspondingly large number of measured particles, the flow-rate may be decreased. The feedback may be automatically implemented or manually implemented.

Method 400(III) includes method 400(II) and further includes step 410. In step 410, the sample chamber is flushed with a reference liquid sample or a blank liquid sample. Step 410 may be performed at least once during a normal operation cycle of method 400(III). For example, sample chamber 106 may be flushed with a reference liquid as an initial calibration during system startup or as a periodically scheduled system maintenance or calibration process. Steps 404 and/or 406 may be performed concurrently with step 410. For example, the particle size distribution and concentration in the reference liquid may be measured via first and second probes. In another embodiment, sample chamber 106 is flushed with a blank liquid. For example, the sample chamber may be flushed as part of a system startup and/or system shutdown process to clean the sample chamber or minimize precipitation of particles thereon. Step 410 may be performed intermittently during operation of method 400 (III).

Figure 5A:
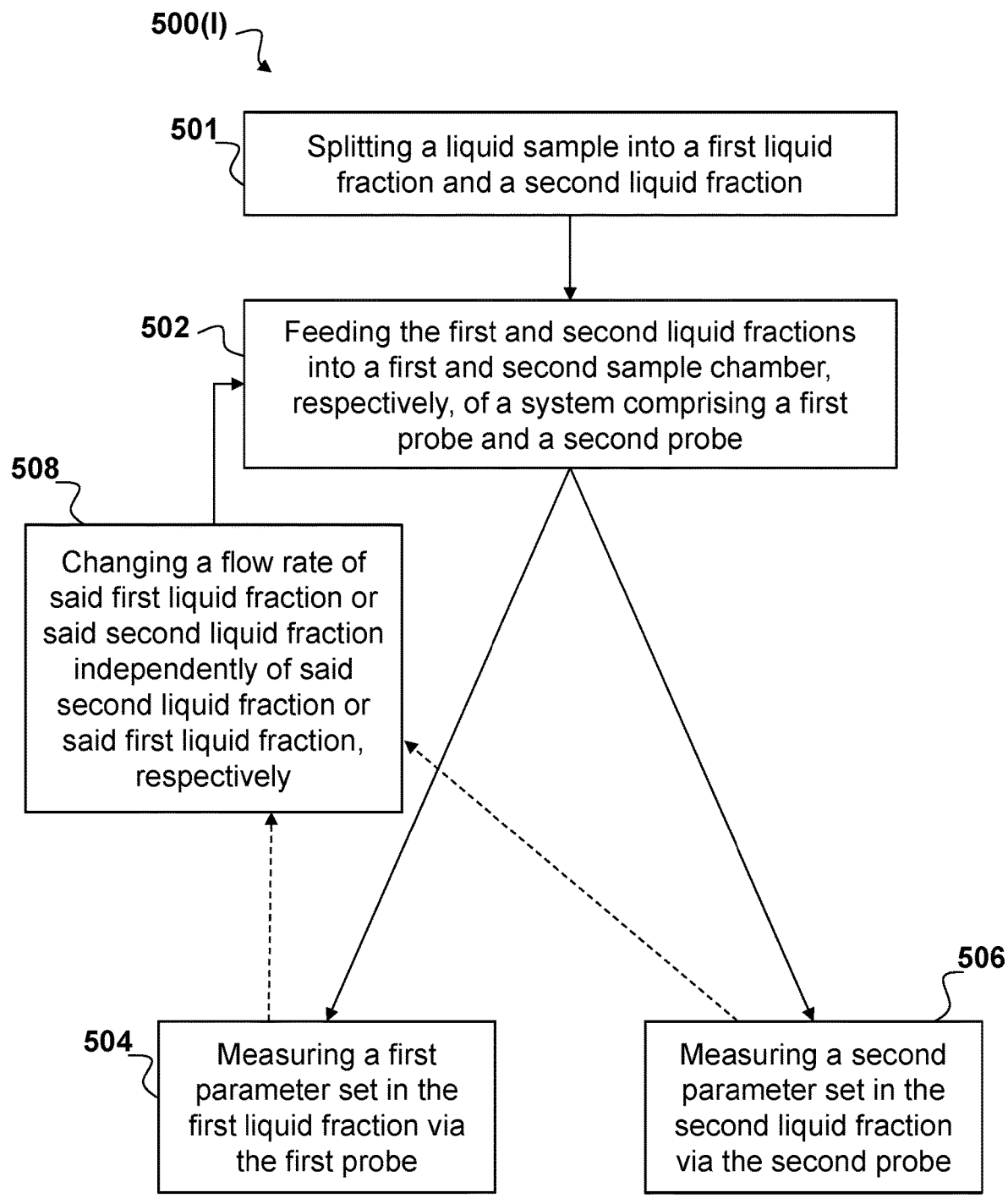
FIG. 5A-5B. Flowcharts showing exemplary embodiments of a method for characterizing a liquid sample.
Figure 5B:
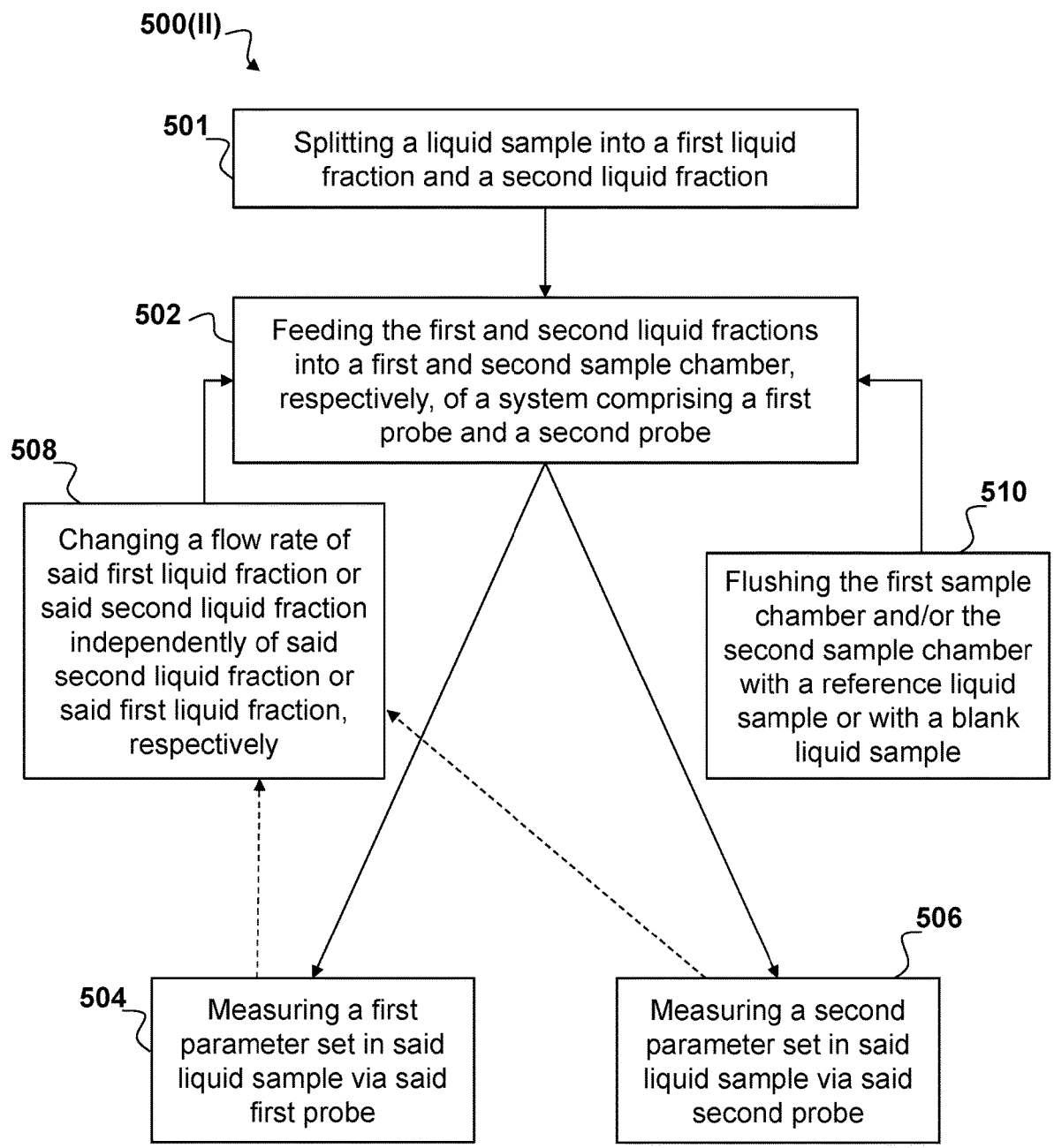

FIGS. 5A and 5B illustrate exemplary embodiments of a method 500 for characterizing a liquid sample. FIG. 5A is a flowchart of method 500(I). Method 500(I) includes step 501, in which a liquid sample is split into a first liquid fraction and a second liquid fraction. The liquid sample may be a sample of the liquid or slurry, such as slurry 004. Method 500(I) further includes step 502, in which the first and second liquid fraction are fed into a first sample chamber and a second sample chamber, respectively, of a system comprising a first probe and a second probe. The first liquid fraction may be first liquid fraction 008(I), the second liquid fraction may be second liquid fraction 008(II), the system may be particle detection system 200, the first probe may be first probe 110, and the second probe may be second probe 120. In step 504, a first parameter set in the first liquid fraction is measured via the first probe. The first parameter set is, for example, a first size distribution and a first concentration of a plurality of first particles in the liquid sample. In step 506, a second parameter set in the second liquid fraction is measured via the second probe. The second parameter set is, for example, a second size distribution and a second concentration of one or more second particles in the liquid sample. Steps 504 and 506 may be performed simultaneously or sequentially in any order. Typically, steps 504 and 506 are performed simultaneously. For example, a single measurement by the first probe and/or by the second probe may be completed within 1 minute, optionally within 1 second, and optionally within 0.5 seconds. Each measurement corresponding to each of step 504 or step 506 yields a data signal (e.g., a data analog signal) that may be converted to a data set by controller 130. Each of steps 504 and 506 may independently be repeated, for example to optimize measurement detection range and/or accuracy and signal-to-noise ratio. Data from any number of the repeated measurements, for each probe respectively, may be processed (e.g., by a controller such as controller 130) to produce a single data set. For example, step 504 may be completed within 1 second and be repeated 10 times in order to increase the signal-to-noise ratio via processing of data corresponding to the 10 measurements of step 504 (e.g., via averaging the 10 datasets from the 10 repetitions of step 504). Method 500(I) optionally further includes step 508, in which a flow rate of the first liquid fraction and/or the second liquid fraction is changed independently of the other of the first liquid fraction or the second liquid fraction. For example, the flow rate of the second liquid fraction may be increased independently of the flow rate of the first liquid fraction. Step 508 may be repeated more than once. For example, the second liquid fraction's flow rate may be increased, then decreased, and then increased again. For example, the flow rate may be changed to optimize the detection range and/or accuracy and signal-to-noise ratio of the first probe's and/or the second probe's measurement(s). Repetition of step 508, if performed more than once, may be performed at any time interval, such as a time interval of 1 second or less, optionally 1 minute or less, and optionally 10 minutes or less. As desired, the systems and methods may incorporate feedback control, as indicated by dashed lines. For example, the flow-rate is optionally controlled, at least in part, based on the data generated by measuring steps 504 and/or 506. For example, if few particles are measured, the flow-rate may be increased, and correspondingly large number of measured particles, the flow-rate may be decreased. The feedback may be automatically implemented or manually implemented.

FIG. 5B is a flowchart of method 500(II) for characterizing a liquid sample. Method 500(II) includes method 500(I), and further includes step 510. In step 510, the first sample chamber and/or the second sample chamber is flushed with a reference liquid or a blank liquid. Step 510 may be performed at least once during a normal operation cycle of method 500(II). For example, sample chambers 106(I) and 106(II) may be flushed with a reference liquid as an initial calibration during system startup or as a periodically scheduled system maintenance or calibration process. Steps 504 and/or 506 may be performed concurrently with step 510. In another embodiment, sample chambers 106(I) and 106(II) are flushed with a blank liquid. Step 510 may be performed intermittently during operation of step 500(II).

The methods disclosed herein for characterizing a liquid sample may have any combination of steps or embodiments of methods 400(I), 400(II), 400(III), 500(I), and 500(II) and of systems 100 and 200.

The invention can be further understood by the following non-limiting examples.

Example 1: In an illustrative example, a particle detection system comprises a first probe that is a light scattering probe configured or optimized for determining a concentration and/or size distribution of a plurality of small particles in a liquid sample. Optimization of the detection of small particles may include having a low flowrate of the liquid sample. For example, the small particles are characterized by a size characteristic that is less than or equal to 200 nm. The particle detection system of this illustrative example comprises a second probe that is a light scattering probe configured or optimized for determining a concentration and/or size distribution of one or more large particles in a liquid sample. Optimization of the second probe for detection of the large particles may include having a high flowrate of the liquid sample. For example, the large particles are characterized by a size characteristic that is greater than 200 nm.

Example 2: In an illustrative example, a particle detection system comprises a first probe that is an ultrasonic probe configured or optimized for determining a concentration and/or size distribution of a plurality of small particles in a liquid sample. Optimization of the detection of small particles may include having a low flowrate of the liquid sample. For example, the small particles are characterized by a size characteristic that is less than or equal to 200 nm. The particle detection system of this illustrative example comprises a second probe that is a light scattering probe configured or optimized for determining a concentration and/or size distribution of one or more large particles in a liquid sample. Optimization of the second probe for detection of the large particles may include having a high flowrate of the liquid sample. For example, the large particles are characterized by a size characteristic that is greater than 200 nm.

Example 3: In an illustrative example, a particle detection system comprises a first probe that is a dark beam probe configured or optimized for determining a concentration and/or size distribution of a plurality of small particles in a liquid sample. Optimization of the detection of small particles may include having a low flowrate of the liquid sample. For example, the small particles are characterized by a size characteristic that is less than or equal to 200 nm. The particle detection system of this illustrative example comprises a second probe that is a light obscuration probe configured or optimized for determining a concentration and/or size distribution of one or more large particles in a liquid sample. Optimization of the second probe for detection of the large particles may include having a high flowrate of the liquid sample. For example, the large particles are characterized by a size characteristic that is greater than 200 nm.

Example 4: In an illustrative example, a particle detection system comprises a first probe that is a dynamic light scattering probe configured or optimized for determining a concentration and/or size distribution of a plurality of small particles in a liquid sample. Optimization of the detection of small particles may include having a low flowrate of the liquid sample. For example, the small particles are characterized by a size characteristic that is less than or equal to 200 nm. The particle detection system of this illustrative example comprises a second probe that is a light obscuration probe configured or optimized for determining a concentration and/or size distribution of one or more large particles in a liquid sample. Optimization of the second probe for detection of the large particles may include having a high flowrate of the liquid sample. For example, the large particles are characterized by a size characteristic that is greater than 200 nm.

Example 5: In an illustrative example, a particle detection system comprises three probes, each of the probes being independently configured or optimized to determine a concentration and/or size distribution of particles in one of three different particle size ranges. Exemplary particle size ranges are, for example, but not limited to, (i) 2 nm to 100 nm, (ii) 100 nm to 500 nm, and (iii) greater than 500 nm. Optionally some of the size ranges overlap. Optionally none of the size ranges overlap with any other. Each of the three probes of the illustrative particle detection system is independently selected from one of the probes disclosed herein, such as one of the probes of Examples 1-4.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms "a", "an", and "the" include plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

When a group of substituents is disclosed herein, it is understood that all individual members of that group and all subgroups, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Every device, system, formulation, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A particle detection system configured to characterize a liquid sample, said particle detection system comprising:
   a first probe configured to determine a first parameter set of a plurality of first small particles in said liquid sample, said first small particles being characterized by a size characteristic selected from a first size range;
       wherein said first parameter set comprises a first size distribution and a first concentration; and
   a second probe configured to determine a second parameter set of one or more second large particles in said liquid sample, said second large particles being characterized by a size characteristic selected from a second size range;
       wherein said second parameter set comprises a second size distribution and a second concentration;
   wherein said first size distribution has an average first size diameter down to 1 nm and said second size distribution has an average second size diameter up to 200 µm, and said average first size diameter is less than said average second size diameter, with an overlap of particle size between the first size range of said first particles and the second size range of said second particles that is less than or equal to 50%, and said first concentration is greater than said second concentration.

2. The system of claim 1, wherein the first size range does not overlap with the second size range.

3. The system of claim 1, wherein the first size range is characterized by the average first size diameter that is less than or equal to 200 nm.

4. The system of claim 1, wherein the second size-range is characterized by the average second size diameter that is greater than 200 nm.

5. The system of claim 1, wherein each of said first probe and said second probe is independently selected from the group consisting of a light scattering probe, a light side scattering probe, a highly parallel light scattering probe, a near forward light scattering probe, a dynamic light scattering probe, a light diffraction probe, a laser diffraction probe, a laser scattering probe, an electroresistance probe, an electrostatic probe, a magnetic probe, a magnetoresistance probe, a pressure probe, flowrate probe, an acoustic probe, an ultrasonic probe, a pulsed Doppler acoustic probe, a structured laser beam probe, a light obscuration probe, an interferometry probe, an aerosolized condensation particle counter, a Coulter counter, an electrophoresis-based particle counter, a photoacoustic probe, a laser induced breakdown detection probe, an inductively coupled plasma mass spectrometry (ICP/MS) probe, and any combination thereof.

6. The system of claim 5, wherein said first probe and said second probe are different.

7. The system of claim 1, wherein said first size range is characterized by the average first size diameter that is selected from the range of 2 nm to 100 nm and wherein said second size range is characterized by the average second size diameter that is greater than 500 nm.

8. The system of claim 1, wherein said first concentration range is selected from the range of $10^3$ particles/m L to $10^{15}$ particles/m L.

9. The system of claim 1, wherein said second concentration range is selected from the range of 0.01 particle/mL to $10^5$ particles/m L.

10. The system of claim 1, wherein said system further comprises a sample chamber configured to receive said liquid sample continuously to continuously monitor said first parameter set and said second parameter set.

11. The system of claim 1, wherein a flow rate of said liquid sample in said system is changeable.

12. The system of claim 1, wherein each of said first probe and said second probe are independently characterized by a measurement time selected from the range of 1 microsecond to 60 minutes.

13. The system of claim 1, wherein said first probe is configured to measure said first parameter set in a first liquid fraction of said liquid sample, said first liquid fraction having a volume less than a volume of said liquid sample; and wherein said second probe is configured to measure said second parameter set in a second liquid fraction of said liquid sample, said second liquid fraction having a volume less than a volume of said liquid sample, wherein a flow rate of said second liquid fraction is greater than a flow rate of said first liquid fraction; the system further comprising a first sample chamber having said first liquid fraction and a second sample chamber having said second liquid fraction.

14. The system of claim 1, wherein said liquid sample has a volume selected from the range of 1 μL to 1 L and a flow rate selected from the range of 0.1 to 1000 mL/min.

15. The system of claim 1, wherein said liquid sample is a slurry.

16. A method for characterizing a liquid sample, said method comprising steps of:
feeding said liquid sample into a particle detection system comprising a first probe and a second probe;
measuring a first parameter set in said liquid sample with said first probe;
wherein said first parameter set comprises a first size distribution and a first concentration of a plurality of first small particles, said first small particles are characterized by a size characteristic selected from a first size range;
measuring a second parameter set in said liquid sample with said second probe;
wherein said second parameter set comprises a second size distribution and a second concentration of one or more second large particles, said second large particles are characterized by a size characteristic selected from a second size range;
wherein said first small particles have an average first size diameter down to 1 nm and said second large particles have an average second size diameter up to 200 μm, and said average first size diameter is less than said average second size diameter, with an overlap of particle size between the first size range of said first particles and the second size range of said second particles that is less than or equal to 50%, and said first concentration is greater than said second concentration.

17. The method of claim 16, wherein the first size range does not overlap with the second size range.

18. The method of claim 16, wherein the first size range is characterized by the average first size diameter that is less than or equal to 200 nm and the second size-range is characterized by the average second size diameter that is greater than 200 nm.

19. The method of claim 16, wherein said first probe and said second probe are different.

20. The method of claim 16, wherein said first concentration is selected from the range of $10^3$ particles/mL to $10^{15}$ particles/mL and said first probe is configured to have a concentration detection range selected from the range of $10^3$ particles/mL to $10^{15}$ particles/m L.

21. The method of claim 16, wherein said second concentration is selected from the range of 0.01 particles/m L to $10^5$ particles/m L and said second probe is configured to have a concentration detection range selected from the range of 0.01 particle/m L to $10^5$ particles/m L.

22. The method of claim 16, wherein said step of feeding is performed continuously or discretely and said steps of measuring are performed continuously or discretely.

23. The method of claim 16, further comprising changing a flow rate of said liquid sample in a sample chamber of said system.

24. The method of claim 16, wherein each of said steps of measuring is independently characterized by a measurement time selected from the range of 1 microsecond to 60 minutes.

25. The method of claim 16, wherein said step of feeding comprises flushing a sample chamber of said system with a reference liquid sample or with a blank liquid sample.

26. The method of claim 16, further comprising a step of splitting said liquid sample into a first liquid fraction and a second liquid fraction, wherein said step of measuring said first parameter set is performed on said first liquid fraction and said step of measuring said second parameter set is performed on said second liquid fraction; and said step of feeding comprises changing a flow rate of said first liquid fraction or said second liquid fraction independently of said second liquid fraction or said first liquid fraction, respectively.

27. The method of claim 16, wherein said liquid sample is a slurry.

28. The system of claim 1, wherein the second probe is a light scattering probe, an ultrasonic probe, a dynamic light scattering probe or a light obscuration probe.

29. The system of claim 1, wherein:
   the first probe is an ultrasonic probe and the second probe is a light scattering probe; or
   the first probe is a dark beam probe and the second probe is a light obscuration probe; or
   the first probe is a dynamic light scattering probe and the second probe is a light obscuration probe.

* * * * *